(12) United States Patent
Horn et al.

(10) Patent No.: US 10,689,937 B1
(45) Date of Patent: Jun. 23, 2020

(54) BLOWOUT PREVENTER WITH PRESSURE EQUALIZATION BLOCK

(71) Applicant: Horn Equipment Company, Inc., Moore, OK (US)

(72) Inventors: Hoby R. Horn, Moore, OK (US); Scott A. Spurlin, Oklahoma City, OK (US); Stephen Kolby Hambright, Moore, OK (US)

(73) Assignee: HORN EQUIPMENT COMPANY, INC., Moore, OK (US)

( * ) Notice: Subject to any disclaimer, the term of this patent is extended or adjusted under 35 U.S.C. 154(b) by 83 days.

(21) Appl. No.: 15/895,649

(22) Filed: Feb. 13, 2018

Related U.S. Application Data

(60) Provisional application No. 62/458,208, filed on Feb. 13, 2017.

(51) Int. Cl.
*E21B 33/06* (2006.01)
*E21B 34/08* (2006.01)
*F16K 39/04* (2006.01)

(52) U.S. Cl.
CPC ............ *E21B 33/063* (2013.01); *E21B 34/08* (2013.01); *E21B 33/06* (2013.01); *F16K 39/04* (2013.01)

(58) Field of Classification Search
CPC ...................................................... F16K 39/04
USPC ............................................... 166/361, 363
See application file for complete search history.

(56) References Cited

U.S. PATENT DOCUMENTS

| 4,347,898 A | * | 9/1982 | Jones ..................... E21B 33/063 166/55 |
| 4,392,633 A | * | 7/1983 | Van Winkle .......... E21B 33/062 251/1.3 |
| 4,553,589 A | * | 11/1985 | Jennings ................. E21B 34/16 137/72 |
| 5,515,916 A | | 5/1996 | Haley |
| 6,164,619 A | * | 12/2000 | Van Winkle .......... E21B 33/062 137/112 |
| 6,719,042 B2 | | 4/2004 | Johnson et al. |
| 6,845,959 B2 | | 1/2005 | Berckenhoff et al. |
| 7,354,026 B2 | | 4/2008 | Urrutia |
| 7,413,019 B2 | | 8/2008 | Hemphill et al. |
| 7,464,765 B2 | | 12/2008 | Isaacks et al. |
| 8,028,755 B2 | | 10/2011 | Darnell et al. |
| 8,230,930 B2 | | 7/2012 | Hemphill et al. |

(Continued)

*Primary Examiner* — Umashankar Venkatesan
(74) *Attorney, Agent, or Firm* — James F. Lea, III; Gable Gotwals

(57) ABSTRACT

A blowout preventer includes a body containing upper and lower ram assemblies. The body defines a surface pressure area above the upper rams and a wellbore pressure area between the upper and lower rams. An upper passageway communicates an outside of the body with the surface pressure area and a lower passageway communicates the outside with the wellbore pressure area. A valve adjacent the outside surface allows communication between the areas for pressure equalization. A bonnet is removed from the body by unfastening a flange from a face of the body and extending the flange from an assembled configuration to an extended configuration, thereby exposing a tool receiving surface on a ram change piston, wherein the piston communicates with the body and the flange. The tool surface is engaged for manipulating and disengaging the piston from one of the body and the flange, thereby facilitating removal of the flange.

13 Claims, 18 Drawing Sheets

(56) References Cited

U.S. PATENT DOCUMENTS

| | | |
|---|---|---|
| 8,944,403 B2 | 2/2015 | Jurena et al. |
| 9,243,469 B2 | 1/2016 | Guo et al. |
| 2006/0113501 A1* | 6/2006 | Isaacks ................ E21B 33/063 251/1.1 |
| 2017/0067309 A1 | 3/2017 | Holland, Jr. et al. |

* cited by examiner

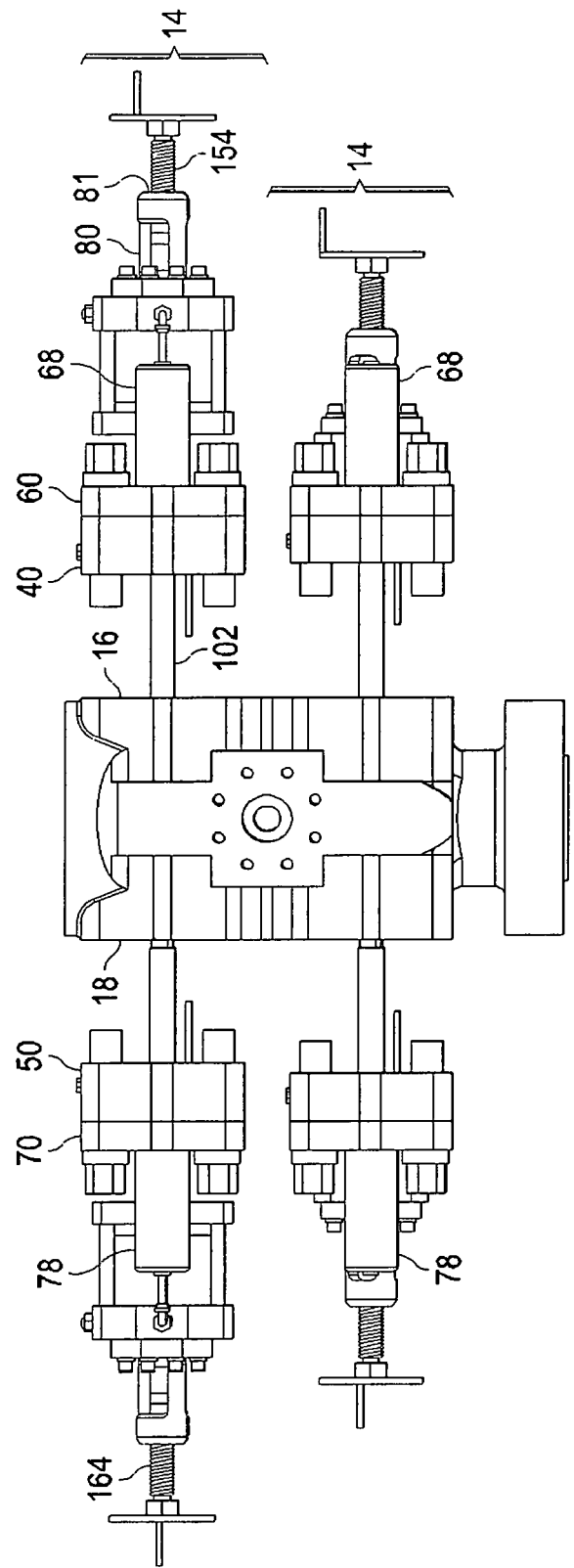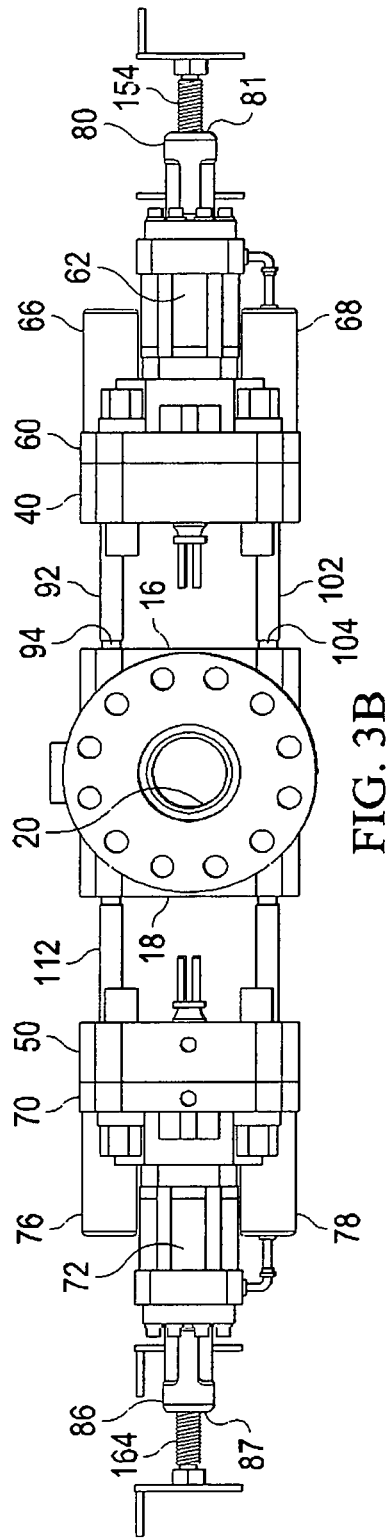
FIG. 3A
FIG. 3B

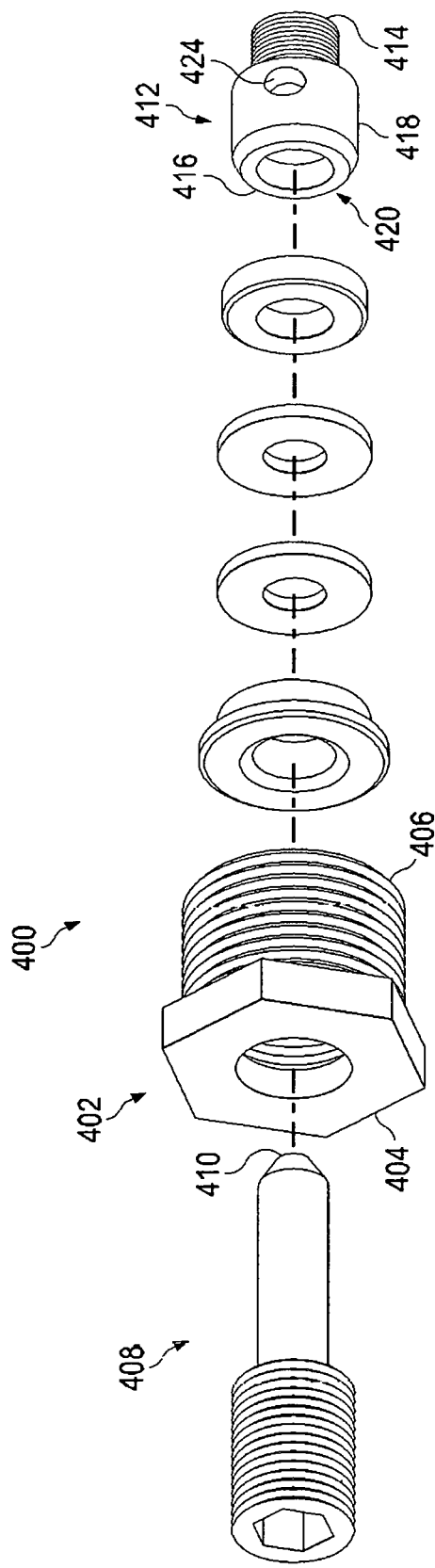
FIG. 13
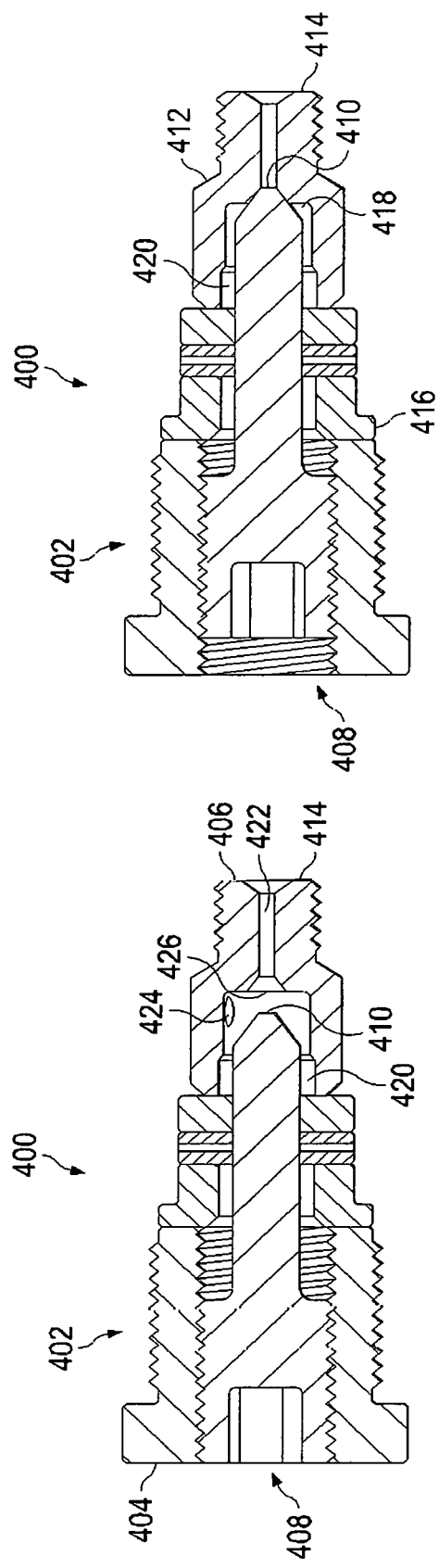
FIG. 14A
FIG. 14B

BLOWOUT PREVENTER WITH PRESSURE EQUALIZATION BLOCK

CROSS REFERENCE TO RELATED APPLICATIONS

This application claims the priority of U.S. Provisional Patent Application No. 62/458,208 titled "BLOWOUT PREVENTER WITH PRESSURE EQUALIZATION BLOCK," filed Feb. 13, 2017, the contents of which are hereby incorporated by reference.

FIELD OF THE INVENTION

The invention relates to blowout preventers. More particularly, the invention relates to pressure equalization methods and apparatus and to a method and apparatus to facilitate effectively servicing the blowout preventer.

BACKGROUND OF THE INVENTION

Coil tubing may be used in the completion and well servicing process of an oil and gas well. Coil tubing is cost effective for both processes. Coil tubing does everything wire line services do, plus adds the ability to control the movement of fluid or gas in and out of the well.

The drilling process of the oil and gas well includes drilling a hole that typically ranges from 5½" to 30" into the earth to a desired depth. The hole is then lined with steel pipe called casing that extends from surface to the bottom of the well. The size of a drilling rig and its components make it very difficult and costly to use the drilling rig in the completion process. The personnel educated and trained for the drilling process are not always qualified for completion or well servicing work. Therefore, technology used for drilling is not necessarily applicable to the completion/well servicing side of the industry. The manufacturers of oil and gas industry equipment tend to specialize in the area of the industry or the other.

A blowout preventer (BOP) is a large piece of equipment used to seal, control and monitor oil and gas wells to prevent a blowout, which is the uncontrolled release of crude oil and/or natural gas from well, which is referred to as a blowout. BOPs are usually installed redundantly in stacks.

Blowout preventers were developed to cope with extreme erratic pressures and uncontrolled flow, also known as "formation kick" that can emanate from a well reservoir. Kicks can lead to a blowout, which is a potentially catastrophic event. In addition to controlling downhole pressure and the flow of oil and gas, BOPs are intended to prevent tubing, such as drill pipe and well casing, tools and drilling fluid from being blown out of the wellbore when a blowout threatens. BOPs safeguard the crew, rig, coiled tubing unit, and environment. BOPS also facilitate monitoring and maintenance of the well.

Two categories of blowout preventer are most prevalent, i.e., ram and annular. BOP stacks frequently utilize both types. Typically, wells are provided with at least one annular BOP stacked above several ram BOPs.

Blowout preventers are used on land wells, offshore rigs, subsea wells, and coiled tubing wireline operations. Land and subsea BOPs are secured to the top of the wellbore, known as the wellhead. BOPs on offshore rigs are mounted below the rig deck. Subsea BOPs are connected to the offshore rig above by a drilling riser that provides a continuous pathway for the drill string and fluids emanating from the wellbore. In effect, a riser extends the wellbore to the rig.

In a ram BOP, ram assemblies are provided to seal off an annulus surrounding a tubular member, and to seal off a well without tubing. Some ram assemblies have the ability to both severe the tubular member and to seal in the well. Typically, blades are affixed to opposing shear rams. The blades are driven together to completely shear the tubular member. The lower portion of the severed tubular member typically remains in the well beneath the shear rams, and the upper portion of the severed tubular member may be removed. A sealing element acting between the upper and lower shear blades or between each blade and the shear ram housing prevent fluid from escaping through the closed shear ram assembly.

A typical BOP has a round ram design that results in a relatively small front sealing surface.

Existing shear ram designs require different cutting blades for each size of coil tubing.

Existing BOPs have a bore pressure equalization system that utilizes a sealing system within the body of the BOP. When repairs are needed, the entire BOP is typically shopped.

SUMMARY OF THE INVENTION

The present invention provides a shear ram assembly with an improved sealing system.

The coiled tubing unit (CTU) of the invention utilizes a stadium style oval ram that increases the seal surface of the ram by 55% compared to a typical blowout preventer having a round ram. The CTU of the invention has a one piece design that will shear all sizes of coil tubing without changing blades or sealing packers. The shearing of larger sized tubing is limited by the force provided by the shear actuator being used. The CTU of the invention utilizes a shear booster actuator that doubles the force of the standard actuator, thereby insuring the ability to shear the largest size of tubing available. The CTU of the invention is designed so that doors on the BOP body can be removed from the body with little to no hydraulic oil spill and disassembled in an environmentally safe area. The CTU of the invention utilizes an equalization block system that is independent of the BOP body and can be easily replaced in the field such that no shop time is required.

The CTU BOP unit of the invention has a one piece SSR (Sealing Shear Ram) ram that is capable of shearing large high yield coil tubing. The SSR ram has specially designed blade angles, shearing blade edge, and pressure seal components for optimum performance.

In one embodiment, the blowout preventer of the invention is designed to be used with a coiled tubing unit. The BOP can be configured in multiple configurations, e.g., as a single ram unit, double ram unit, triple ram unit, quad ram unit, etc. The function of the BOP is to seal the wellbore under different conditions. Each ram bore will have one set of opposing rams, i.e., two rams, that are activated by hydraulic pressure. The rams will be forced to move together by a hydraulically activated operating piston. The rams move together simultaneously for sealing against each other.

In one embodiment, the sealing shear rams are designed to be used as a set of two, with one top shear ram/blade and one bottom shear ram/blade. The rams are activated via hydraulic pressure from a hydraulic accumulator through the BOP unit. The rams move towards each other, eventually overlapping, while shearing the coiled tubing inside the wellbore. Once shearing has been completed, the rams will completely seal off the wellbore pressure from below the rams.

The unit of the invention features a through bore, i.e., a bore in the center of the unit to the well bore, that can be configured with multiple diameters, e.g., a diameter of 3 1/16", 4 1/16", and 5 1/8". Example available pressure ratings are 5000 psi, 10000 psi, and 15000 psi. In one embodiment, the ram bore has stadium/oval design that is 6.5" wide side to side and 4" high top to bottom. Each side may have a 2" radius and a flat on the top and bottom measuring 2.5" side to side.

Shear Blade Data and Explanation

In one embodiment, a 45° angle on the shear blade is used to cut the tubing in a way that produces a cut on the tubing, so that the tubing is not crushed. By not crushing the tubing, a cut end is provided that can be fished out of the hole after the cut.

Fishing includes sending a tool called an overshot down into the hole. The overshot latches itself onto the outside diameter of the tubing. Once the overshot engages the tubing and is pulled back towards the ground surface, the overshot bites the tubing. The biting of the tubing by the overshot allows for operators to pull the sheared tubing out of the well bore.

If the tubing is cut in a way that crushes the tubing, fishing operations are more difficult. If the tubing is crushed, a mill must be sent into the hole to cut off, or mill off, the crushed portion of tubing to provide a clean outside diameter on the tubing for a successful fishing operation.

A 45° blade angle limits the amount of crush on the tubing, which enables a fishing operation without the need of milling the tubing prior to fishing.

Current industry standards require that shear blades be capable of performing three successful shearing operations before the blades are rendered scrap. However, utilizing the apparatus of the invention, "Blue Coiled Tubing", which is the highest yield strength tubing currently available on the market, has been sheared 9 times with the same set of blades. The 9 shearing operations provided an identical shear on the tubing. Therefore, the apparatus of the invention will provide operators with a consistent cut that can be easily "fished" from the wellbore.

By using a booster in conjunction with the shear blade, shear blades of the invention have sheared the highest yield strength coiled tubing using a hydraulic pressure of 1700 psi and less. The hydraulic system of the invention may operate at a pressure of 3000 psi. In contrast to the hydraulic system of the invention, existing current industry designs are not capable of shearing some of the higher yield strength coiled tubing.

The bottom shear ram/blade preferably features an opening, which is preferably from 90° to 130°; more preferably, 110°. In one embodiment, the opening has a mouth radius of 0.627 and a chamfer of 45° to provide for a smooth cut. Other blade angles are contemplated as being effective, e.g., from 40° to 60°. A top seal along the top and side of the ram is provided, as well as a front packer to seal once shearing/cutting tubing has been completed. The front packer is the inverse of the top shear ram/blade to ensure a seal along the top shear ram cutting blade.

The top shear ram/blade features an opening, which is preferably from 90° to 130°; more preferably approximately 135°. The opening has no mouth radius and a chamfer of 40°. Other blade angles are contemplated as being effective, e.g., 35° to 60°. There is a top seal along the top and side of the ram as well as a side packer on each side to seal once shearing/cutting the tubing is completed. The side packers seal against the BOP unit ram bore and the top seal.

The rams are preferably made as a one piece unit. The rams will cut the coiled tubing and seal the well bore in a single process. The shear rams, e.g., 5 1/8 shear rams, are capable of cutting all sizes of coiled tubing currently available without needing to make adjustments such as changing the blades or seals.

The BOP of the invention is sized to allow for usage in coiled tubing operations. This reduces the weight and size of the unit. The BOP of the invention provides the flexibility to be used on a wide range of wells of different pressures and sizes.

The door assembly may be removed from the unit body as an assembly and does not require disassembly of the door for removal.

The BOP of the invention uses a stadium/oval ram bore as opposed to circular design. Using this ram bore design provides flexibility in the design of the rams, as well as, providing for larger sealing surfaces on the rams.

The BOP of the invention includes hydraulic communication ports. The ports allow each set of rams to be hydraulically operated using one hydraulic connection for the closing of the rams and one hydraulic connection for the opening of the rams.

The BOP of the invention includes communication between ram cavities that provide an option of equalizing the bore above closed rams.

The BOP of the invention has the ability to equalize pressure from below the rams to the top of the rams via a pressure equalization block.

BRIEF DESCRIPTION OF THE DRAWINGS

FIG. 3A is an elevation view of the blowout preventer of FIG. 1 in an open configuration.

FIG. 3B is a plan view of the blowout preventer of FIG. 3A in an open configuration.

FIG. 13 is an exploded view of the pressure control valve received in the pressure equalization block of FIGS. 12A and 12B.

FIG. 14A is an elevation view of the pressure control valve of FIG. 13 shown in an open configuration.

FIG. 14B is an elevation view of the pressure control valve of FIG. 13 shown in a closed configuration.

DETAILED DESCRIPTION OF THE PREFERRED EMBODIMENTS

Figure 1:
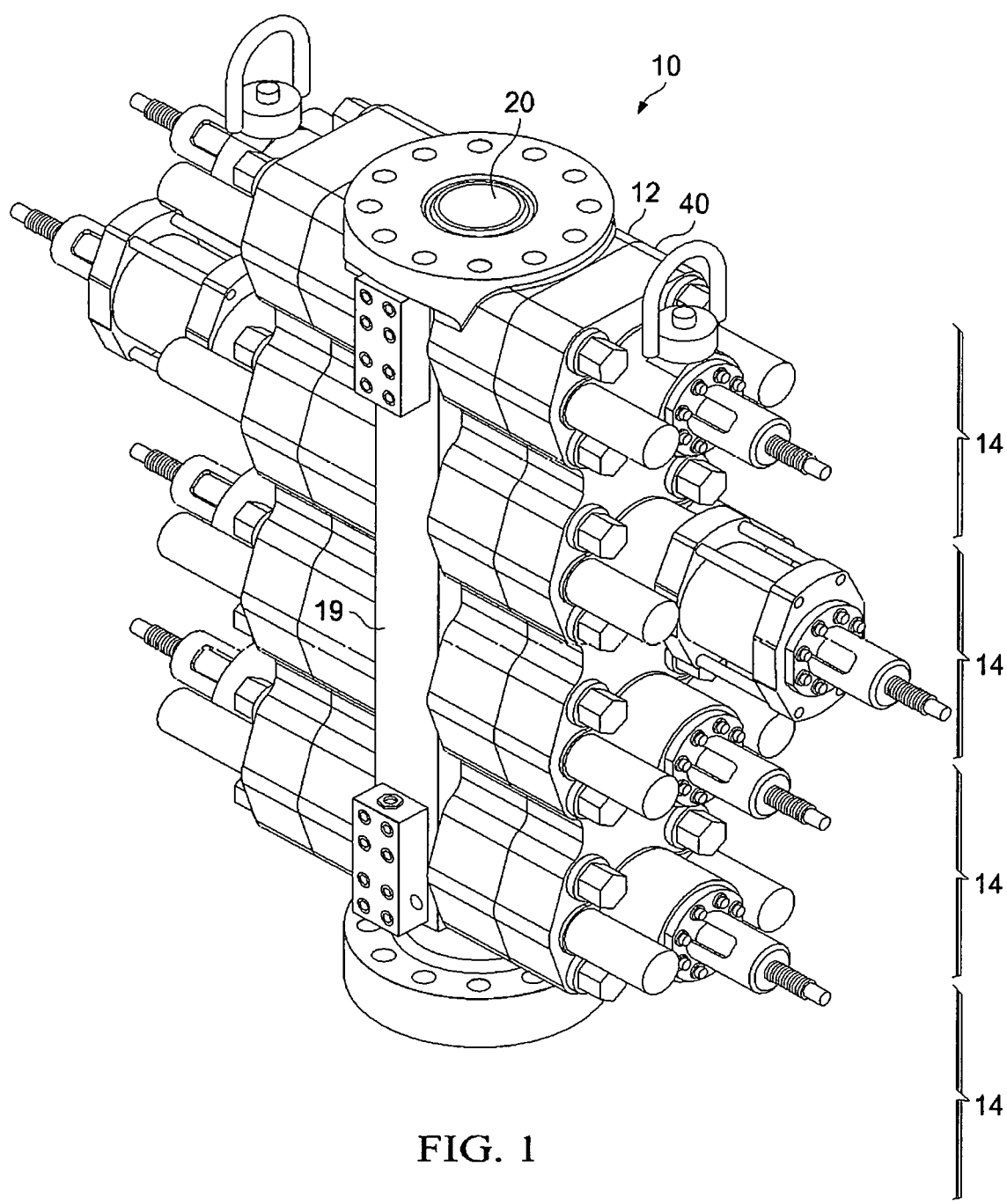
FIG. 1 is a perspective view of a blowout preventer in an assembled configuration.
Figure 2:
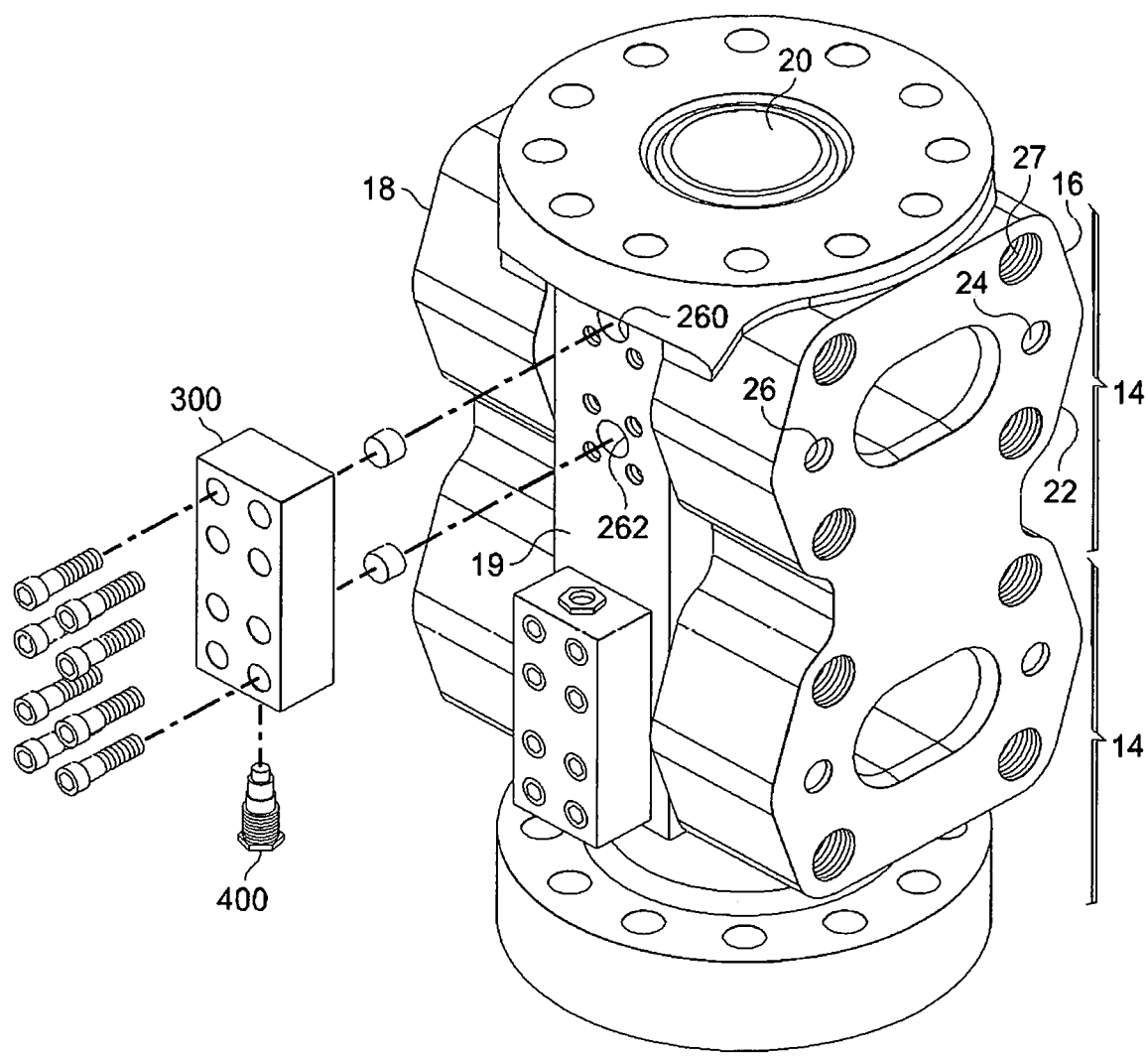
FIG. 2 is a perspective view of a blowout preventer body.

Referring now to FIG. 1, shown is blowout preventer assembly 10. Blowout preventer assembly 10 includes body 12. Body 12 is made up of a plurality of segments 14. Body 12 may be provided with two or more segments. For example, body 12 of FIG. 1 has four segments. Body 12 of FIG. 2 has two segments. Each of segments 14 have a first face 16 and a second face 18 (FIG. 2) on opposite sides of central section 19. Body 12 defines a vertical throughbore 20 (FIGS. 1, 2, 5) that passes between first face 16 and second face 18.

First face 16 defines first ram bore orifice 22, first open ram change rod orifice 24, and first closed ram change rod orifice 26 and a plurality of attachment bolt orifices 27 for receiving attachment bolts 29. Second face 18 defines second ram bore orifice 30 (not shown), second open ram change rod orifice 32 (not shown), and second closed ram change rod orifice 34 (not shown). Orifices 30, 32, and 43 of second face 18 are similarly configured to orifices 22, 24, and 26 of first face 16.

First intermediate flange 40 (FIGS. 1, 3A, 3B, 5) is affixed to first face 16. First intermediate flange 40 defines first intermediate operating piston orifice 42 (FIG. 5), first intermediate open ram change rod orifice 44 (FIG. 5), first intermediate closed ram change rod orifice 46 (FIG. 5) and a plurality of intermediate bolt orifices 48 for receiving attachment bolts 29.

Second intermediate flange 50 (FIG. 3) is affixed to second face 18. Second intermediate flange 50 (FIGS. 1, 3) defines a second intermediate operating piston orifice 52 (not shown) and a second intermediate open ram change rod orifice 54 (not shown), and a second intermediate closed ram change rod orifice 56 (not shown). Orifices 52, 54, and 56 of second intermediate flange 50 are similarly configured to orifices 42, 44, and 46 of first intermediate flange 40.

Figure 4:
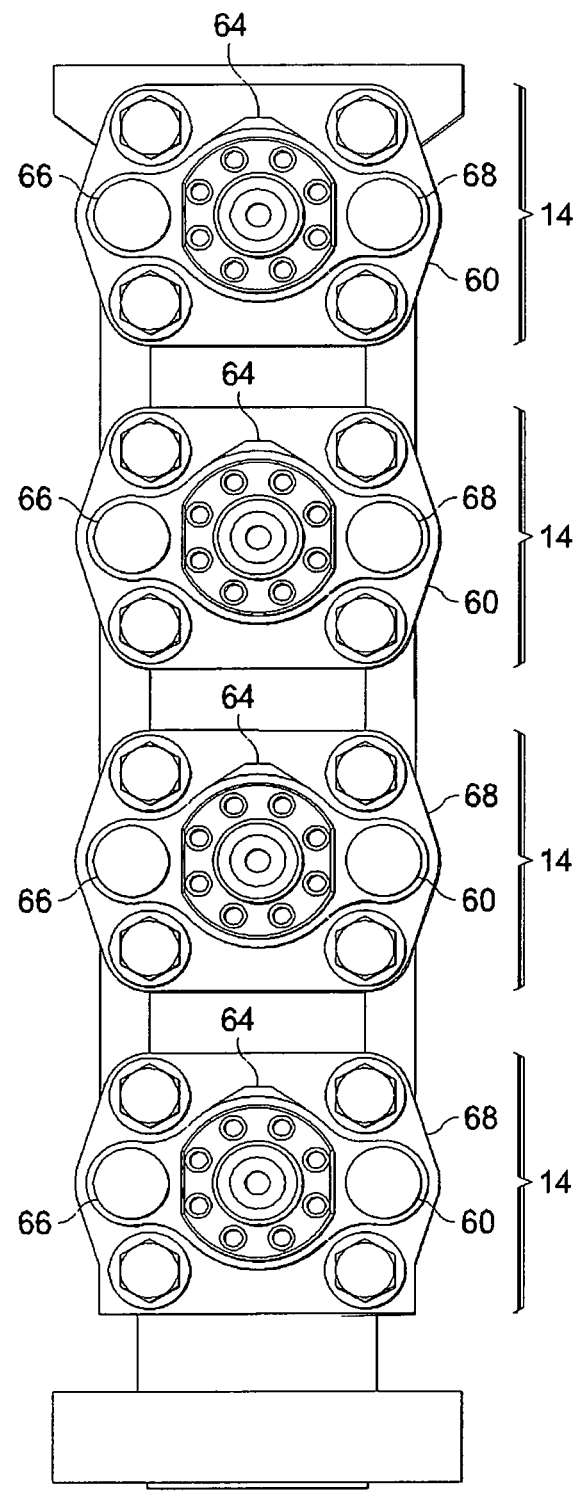
FIG. 4 is a side elevation view of the blowout preventer of FIGS. 1 and 3.

First bonnet 60 (FIGS. 1, 3B, 5) is affixed to first intermediate flange 40. First bonnet 60 defines first operating piston chamber 62 (FIG. 5), first bonnet operating piston orifice 64 (FIG. 4) that is in communication with first operating piston chamber 62. First bonnet 60 additionally defines a first bonnet open ram change rod chamber 66 and a first bonnet closed ram change rod chamber 68 (FIGS. 3A, 3B, 5).

Second bonnet 70 (FIGS. 3A, 3B) is affixed to second intermediate flange 50. Second bonnet 70 defines second operating piston chamber 72 (FIG. 3B) and second bonnet operating piston orifice 74 (not shown) in communication with second operating piston chamber 72. Second bonnet 70 additionally defines second bonnet open ram change rod chamber 76 (not shown) and second bonnet closed ram change rod chamber 78 (not shown). Second bonnet chambers 72, 76, and 78 of second bonnet 70 are similar to chambers 62, 66, and 68 of first bonnet 60.

First lock screw housing 80 (FIGS. 3A, 3B) is affixed to first bonnet 60 in first bonnet operating piston orifice 64. First lock screw housing 80 defines first lock screw orifice 81. Second lock screw housing 86 is affixed to second bonnet 70 adjacent to second bonnet operating piston orifice 74. Second lock screw housing 86 defines second lock screw orifice 87.

Figure 5:
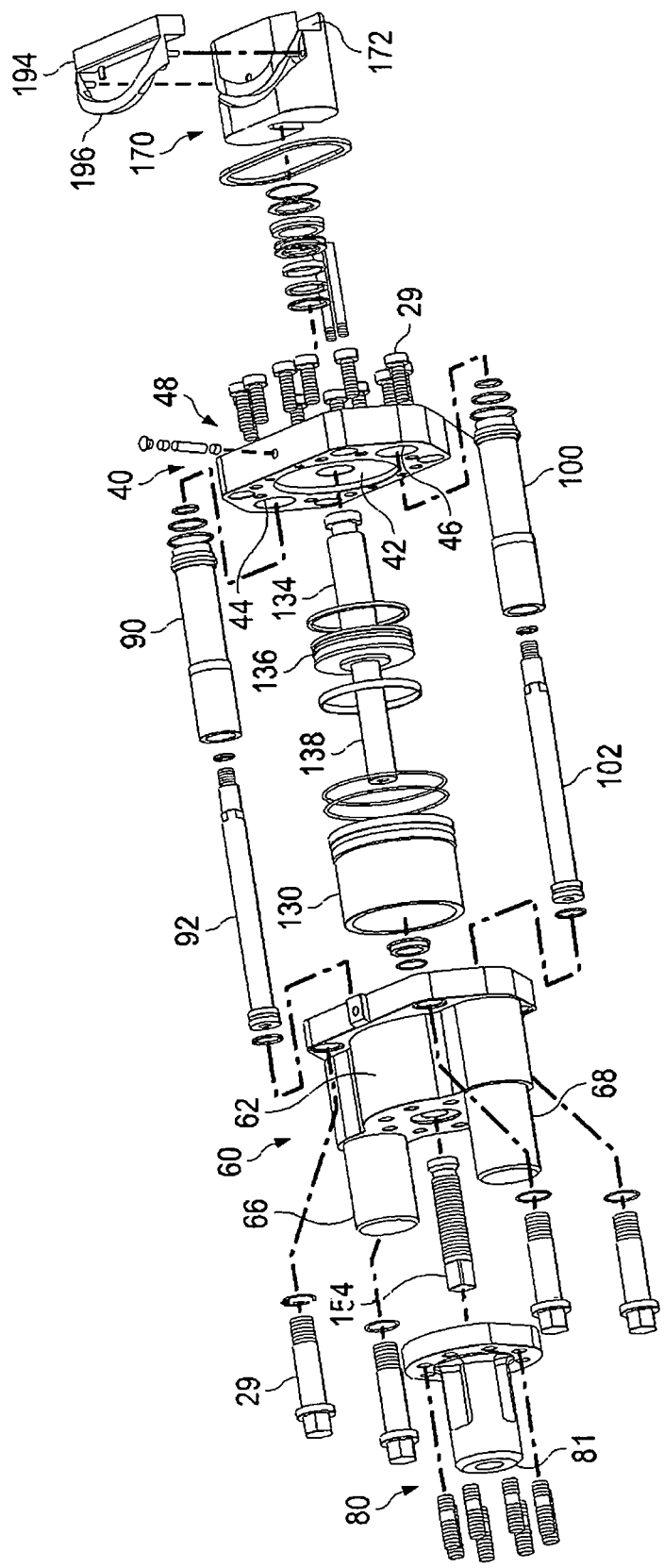
FIG. 5 is a partial cross-section view of a segment of the blowout preventer of FIG. 1.
Figure 6A:
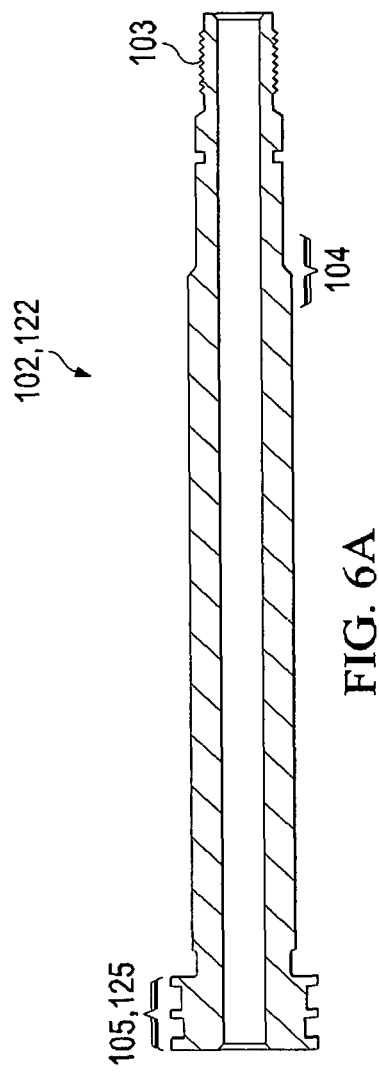
FIG. 6A is a cross-sectional view of the ram change piston close.
Figure 6B:
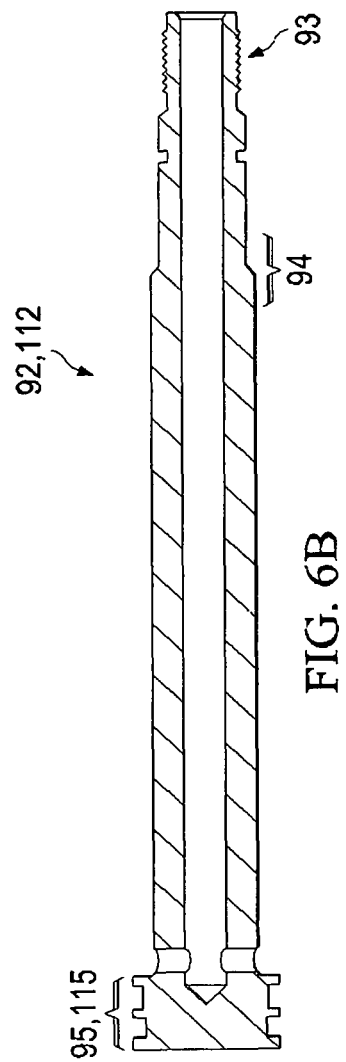
FIG. 6B is a cross-sectional view of the ram change piston open.

Referring now to FIG. 5, first open ram change cylinder 90 is received in first intermediate open ram change rod orifice 44. First open ram change piston 92 (FIGS. 5, 6B) is received in first open ram change cylinder 90. First open ram change piston 92 passes into first bonnet open ram change rod chamber 66 of first bonnet 60. First open ram change piston 92 has threads 93 on a threaded end for threadably engaging first open ram change rod orifice 24. First open ram change piston has first open ram change piston head 95 on a piston head end. A tool receiving surface, such as wrench flats 94, adjacent to threads 93, are accessible when first intermediate flange 40 is detached from body 12. The tool receiving surfaces, such as wrench flats 94 enable first open ram change piston 92 to be unscrewed from first open ram change rod orifice 24. Unscrewing first open ram change piston 92 facilitates the removal of a door assembly, i.e., facilitates disconnecting of first intermediate flange 40 from body 12 as shown in FIGS. 3A and 3B.

Still referring to FIG. 5, first closed ram change cylinder 100 is received in first intermediate closed ram change rod orifice 46. First closed ram change piston 102 (FIGS. 5, 6A) is received in first closed ram change cylinder 100. First closed ram change piston 102 passes into first bonnet closed ram change rod chamber 68 of first bonnet 60. First closed ram change piston 102 has threads 103 on a threaded end for threadably engaging first closed ram change rod orifice 26. First closed ram change piston has first closed ram change piston head 105 on a piston head end. A tool receiving surface, such as wrench flats 104, adjacent to threads 103, are accessible when first intermediate flange 40 is detached from body 12. Wrench flats 104 enable first closed ram change piston 102 to be unscrewed from first closed ram change rod orifice 26. Unscrewing first closed ram change piston 102 facilitates the removal of a door assembly, i.e., facilitates disconnecting of first intermediate flange 40 from body 12.

Second open ram change cylinder 110 is received in a second intermediate open ram change rod orifice 54. Second open ram change piston 112 (FIG. 6B) is received in said second open ram change cylinder 110. Second open ram change piston 112 passes into second bonnet open ram change rod chamber 74 of second bonnet 70. Second open ram change piston 112 has threads 93 on a threaded end for threadably engaging second open ram change rod orifice 26. Second open ram change piston 112 has first open ram change piston head 115 on a piston head end. A tool receiving surface, such as wrench flats 94, adjacent threads 93, are accessible when second intermediate flange 50 is detached from body 12. Second open ram change cylinder 110 is similar to first open ram change cylinder 90.

Second closed ram change cylinder 120 (not shown) is received in a second intermediate closed ram change rod orifice 56. Second closed ram change piston 122 (FIG. 6A) is received in second closed ram change cylinder 120. Second closed ram change piston 122 passes into second bonnet closed ram change rod chamber 76 of second bonnet 70. Second closed ram change cylinder 120 is similar to first closed ram change cylinder 100. Second closed ram change piston 122 has threads 103 on a threaded end for threadably engaging second closed ram change rod orifice 56. Second closed ram change piston 122 has second closed ram change piston head 125 on a piston head end. A tool receiving surface, such as wrench flats 104, adjacent to threads 103, are accessible when second intermediate flange 50 is detached from body 12. A tool receiving surface, such as wrench flats 104, enable second closed ram change piston 102 to be unscrewed from second closed ram change rod orifice 56. Unscrewing second ram change piston 122 facilitates the removal of a door assembly, i.e., facilitates disconnecting of second intermediate flange 50 from body 12.

A first operating cylinder 130 (FIG. 5) is sealingly received in said first operating piston chamber 62. First operating cylinder 130 defines a first piston receiving orifice 132 (not shown). A first operating piston 136 has a first inwardly extending shaft 134 that extends from an inner surface of the first operating piston 136. A first outwardly extending shaft 138 extends from an outer surface of the first operating piston 136. First outwardly extending shaft 138 is received within first piston receiving orifice 132.

A second operating cylinder 140 (not shown) is sealingly received in said second operating piston chamber 72. Second operating cylinder 140 defines a second piston receiving orifice 142 (not shown). A second operating piston 146 has a second inwardly extending shaft 144 (not shown) that extends from an inner surface of the second operating piston 146. A second outwardly extending shaft 148 (not shown) extends from an outer surface of the second operating piston 146. Second outwardly extending shaft 148 is received within second piston receiving orifice 142. Second cylinder's orifices and shafts 140, 142, 144, and 146 are similar to first cylinder's orifices and shafts 130, 132, 134, 136, and 138.

First locking screw 154 (FIGS. 3A, 3B, 5) passes through said first locking screw orifice 81, through an orifice in said first bonnet 60 and into said first operating piston chamber 62 for engaging an outer end of said first outwardly extending shaft 138.

Second locking screw 164 (FIGS. 3A, 3B) passes through said second locking screw orifice 87 (not shown), through an orifice in said second bonnet 70 and into said second operating piston chamber 72 (not shown) for engaging an outer end of said second outwardly extending shaft 148 (not shown). Second locking screw and orifice 164, 87 are similar to first locking screw and orifice 154, 81.

Figure 7A:
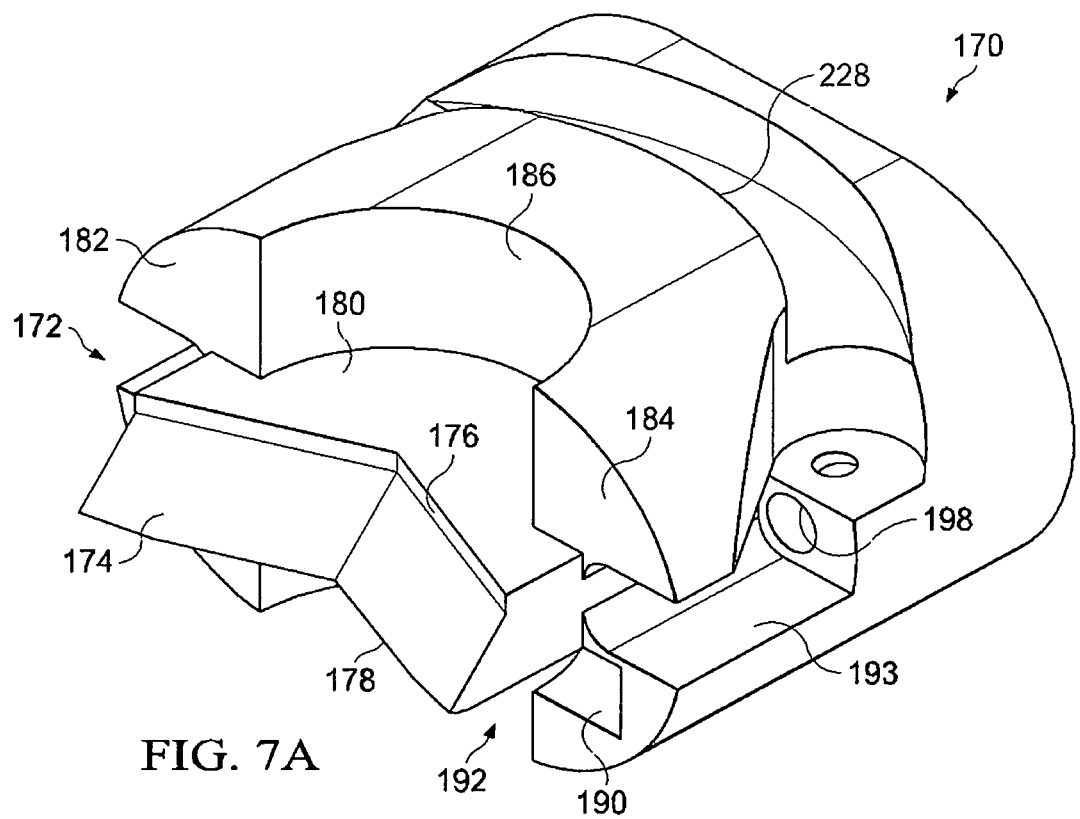
FIG. 7A is a perspective view of a top blade of the sheer ram.
Figure 7B:
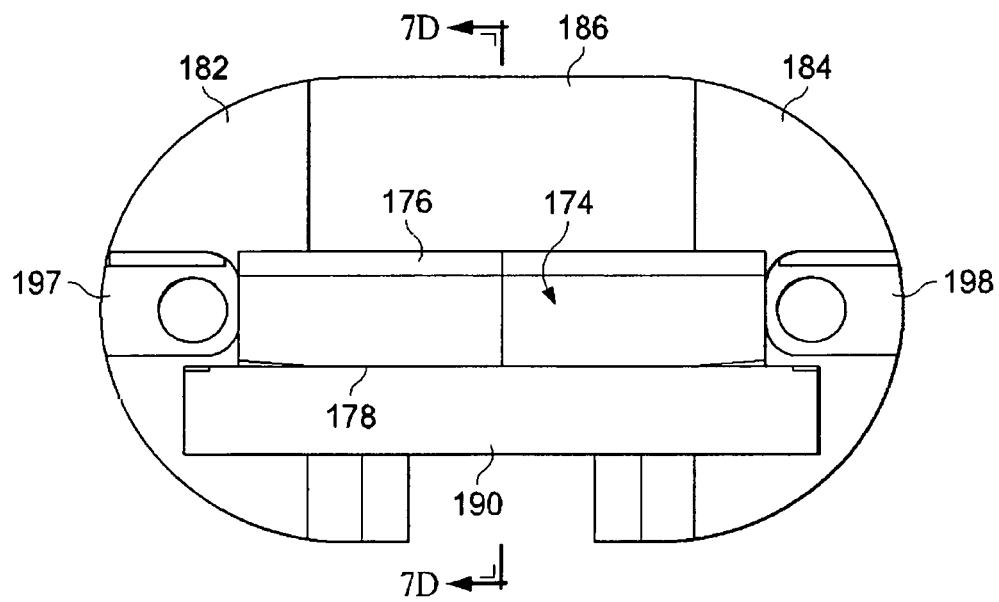
FIG. 7B is a front elevation view of the top blade of FIG. 7A.
Figure 7C:
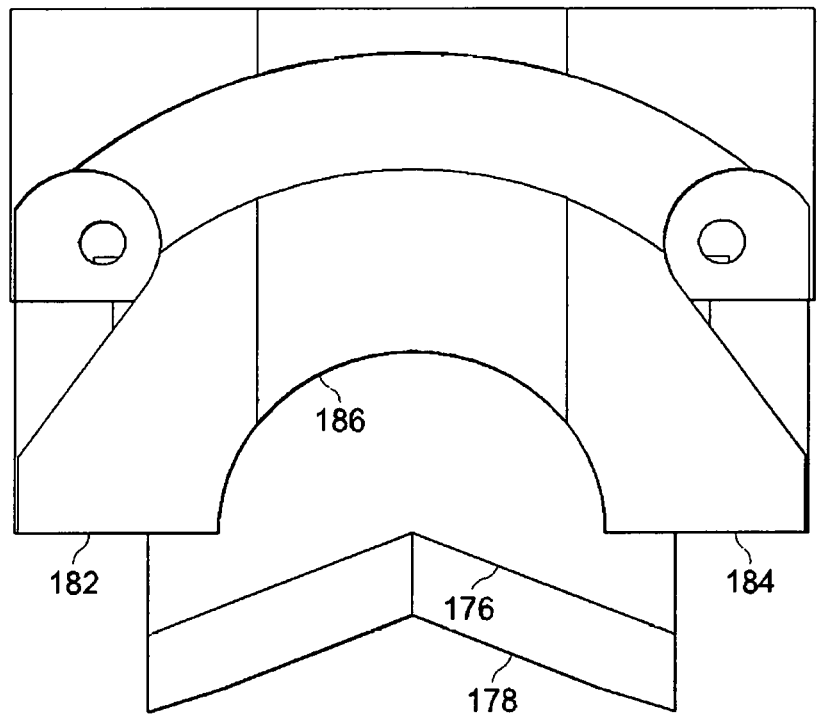
FIG. 7C is a top view of the top blade of FIG. 7A.
Figure 7D:
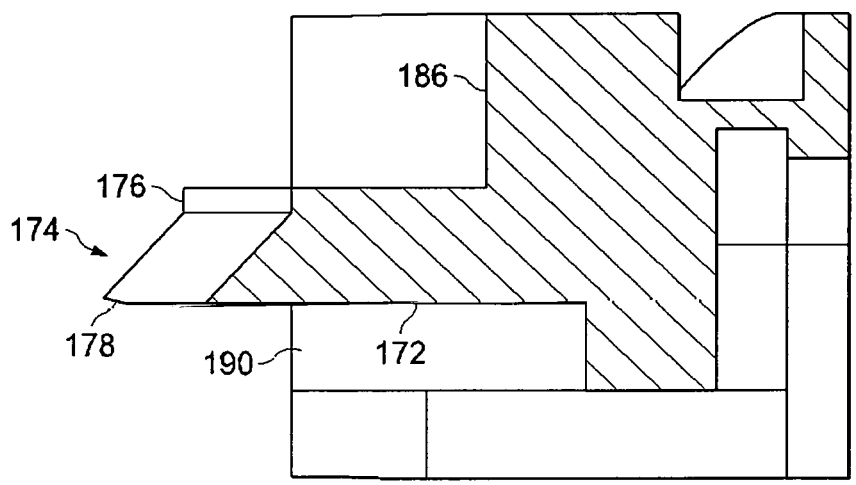
FIG. 7D is a cross-sectional view taken along lines D-D of FIG. 7B.
Figure 7E:
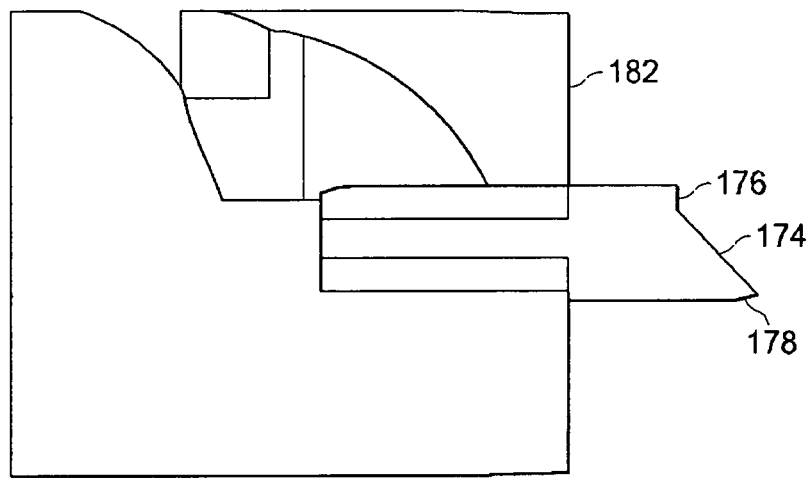
FIG. 7E is a side view of the top blade of FIG. 7A.
Figure 7F:
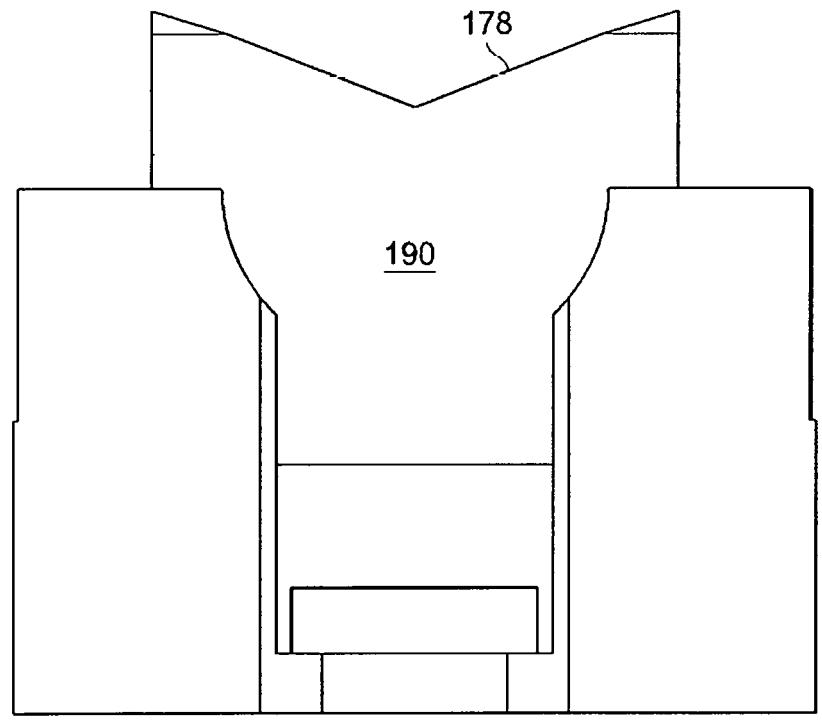
FIG. 7F is a bottom view of the top blade of FIG. 7A.
Figure 8A:
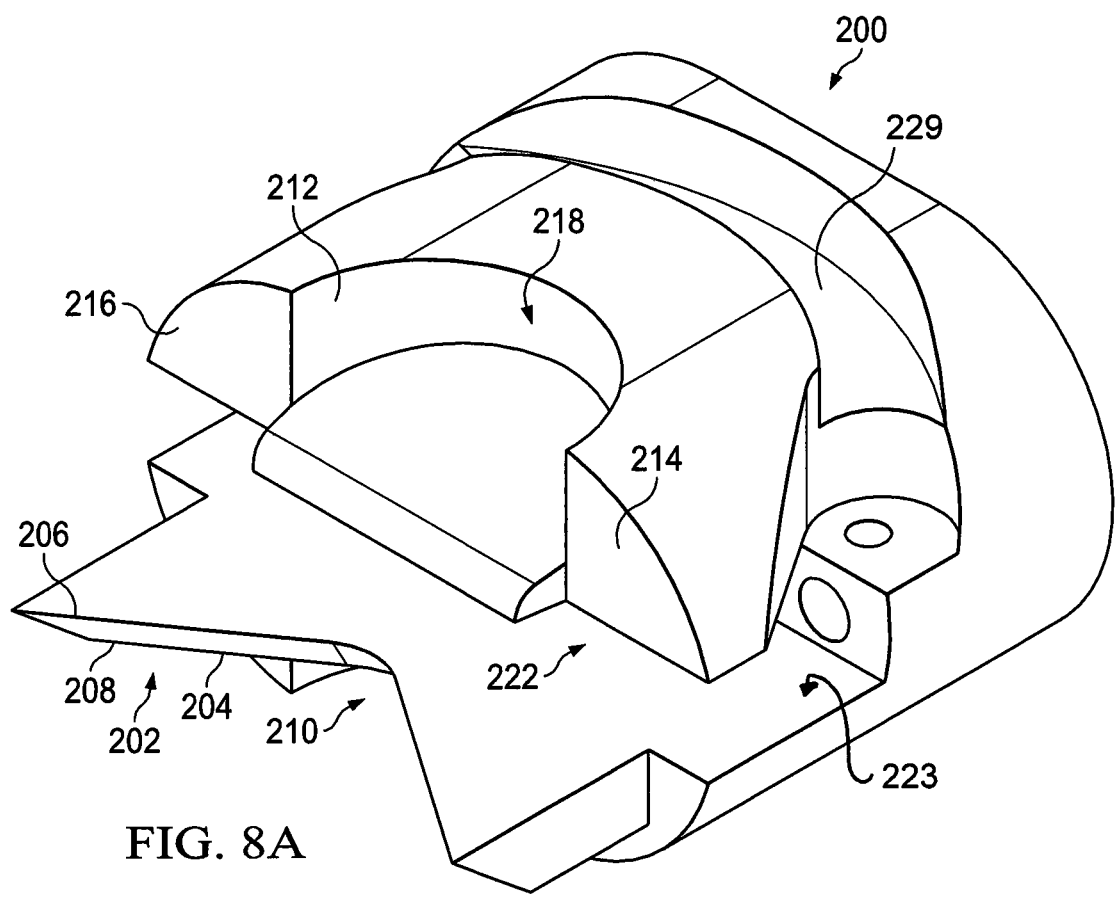
FIG. 8A is a perspective view of a bottom blade of the sheer RAM.
Figure 8B:
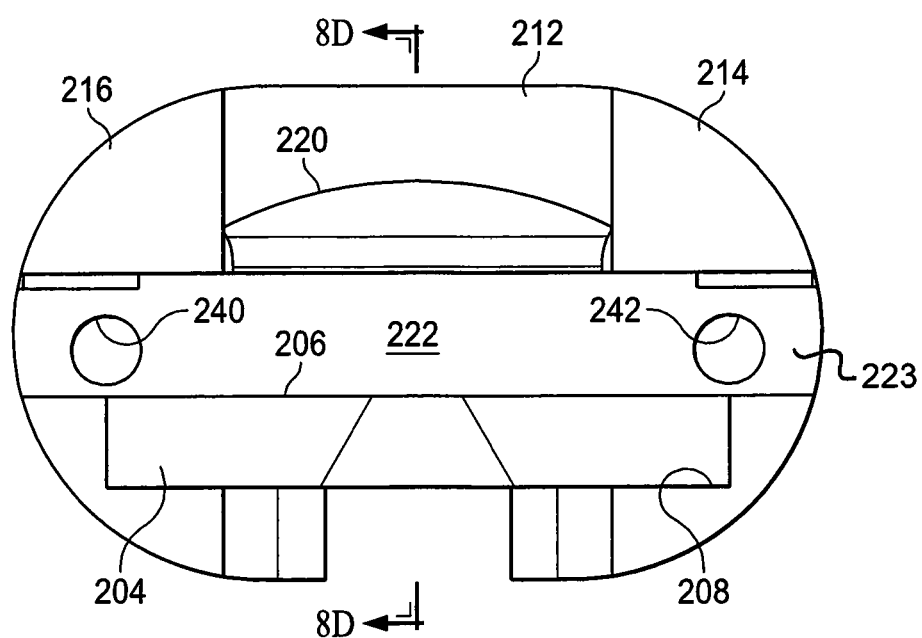
FIG. 8B is a schematic front elevation view of the bottom blade of FIG. 8A.
Figure 8C:
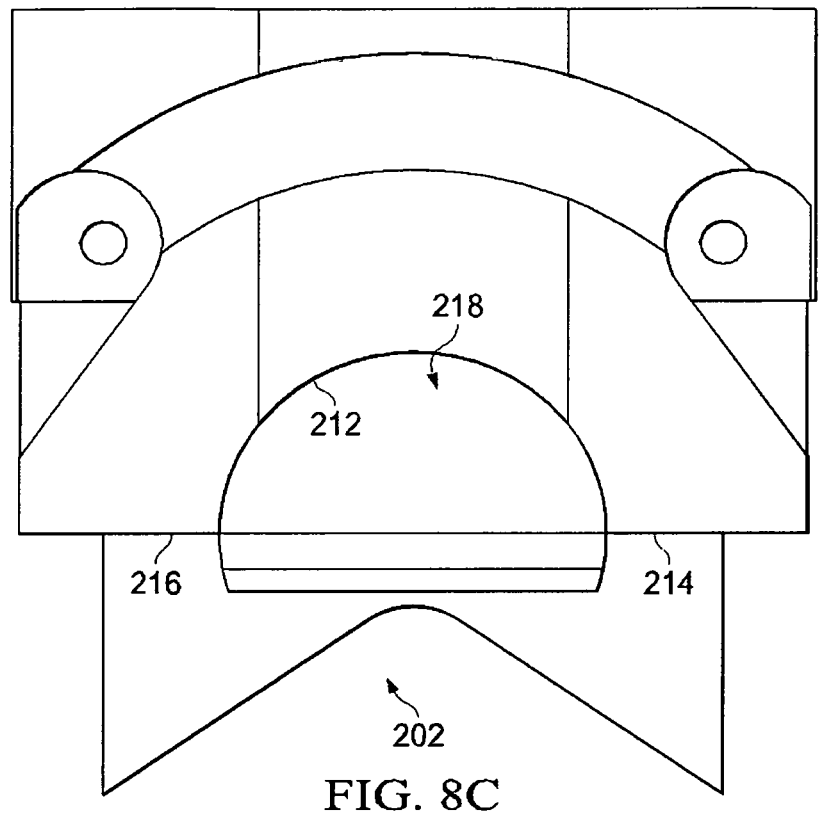
FIG. 8C is a top view of the bottom blade of FIG. 8A.
Figure 8D:
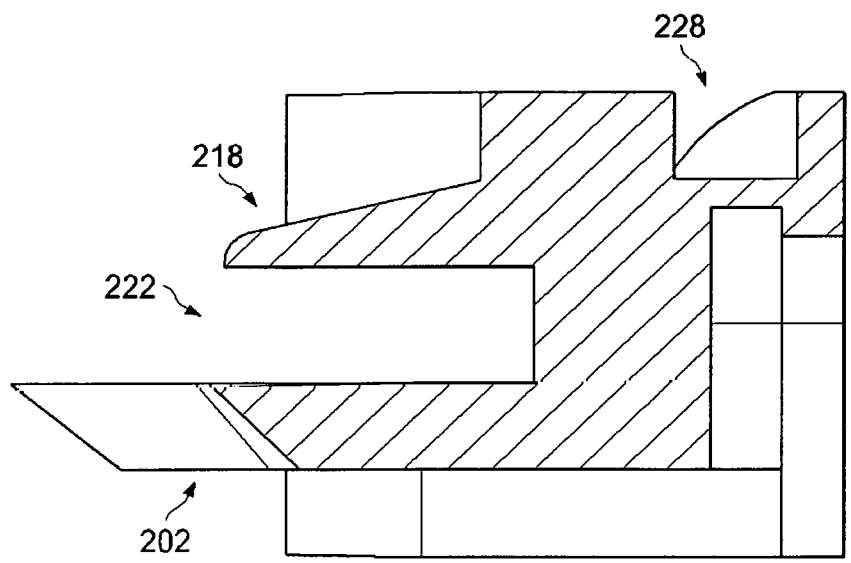
FIG. 8D is a cross-sectional view taken along lines D-D of the bottom blade of FIG. 8B.
Figure 8E:
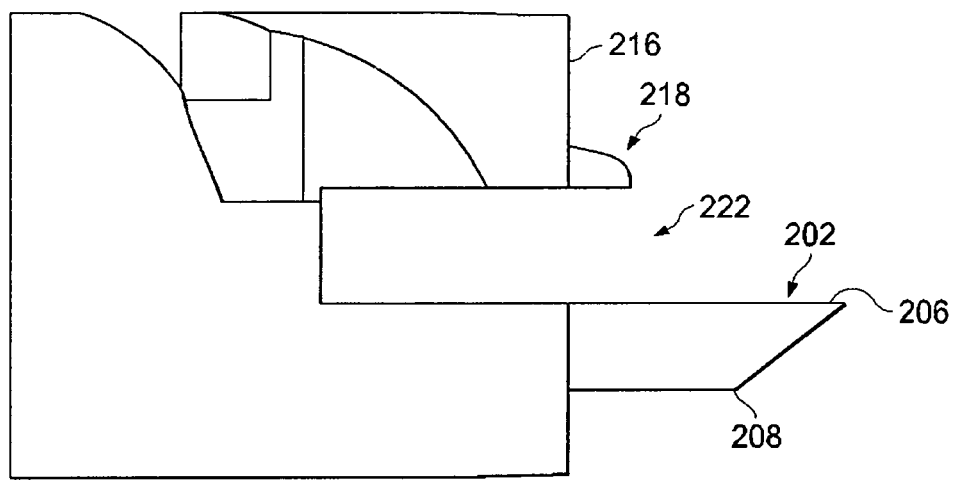
FIG. 8E is a side view of the bottom blade of FIG. 8A.
Figure 8F:
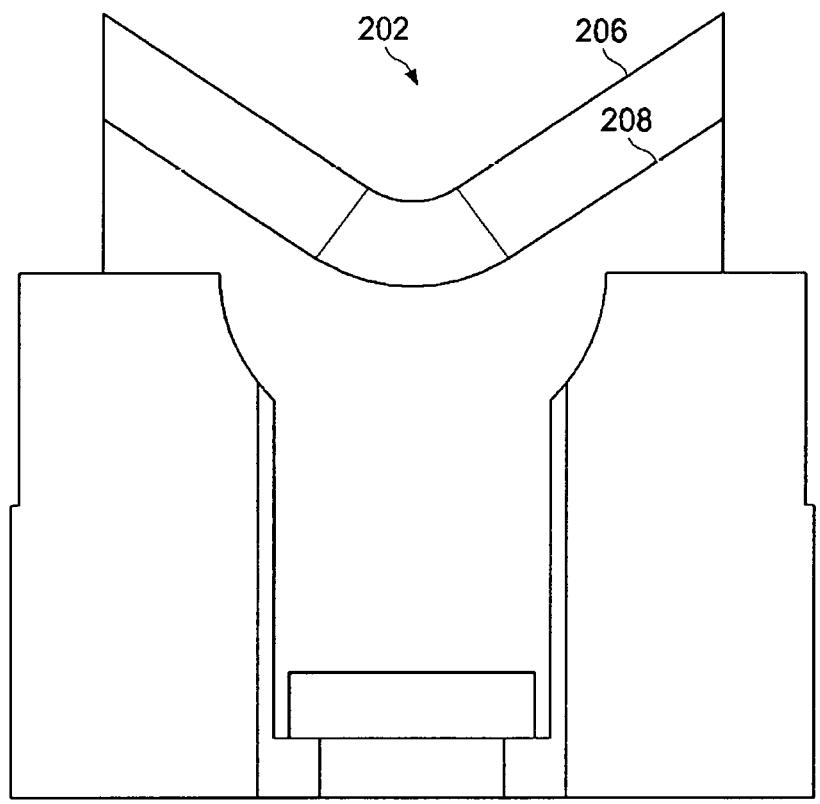
FIG. 8F is a bottom view of the bottom blade of FIG. 8A.
Figure 9A:
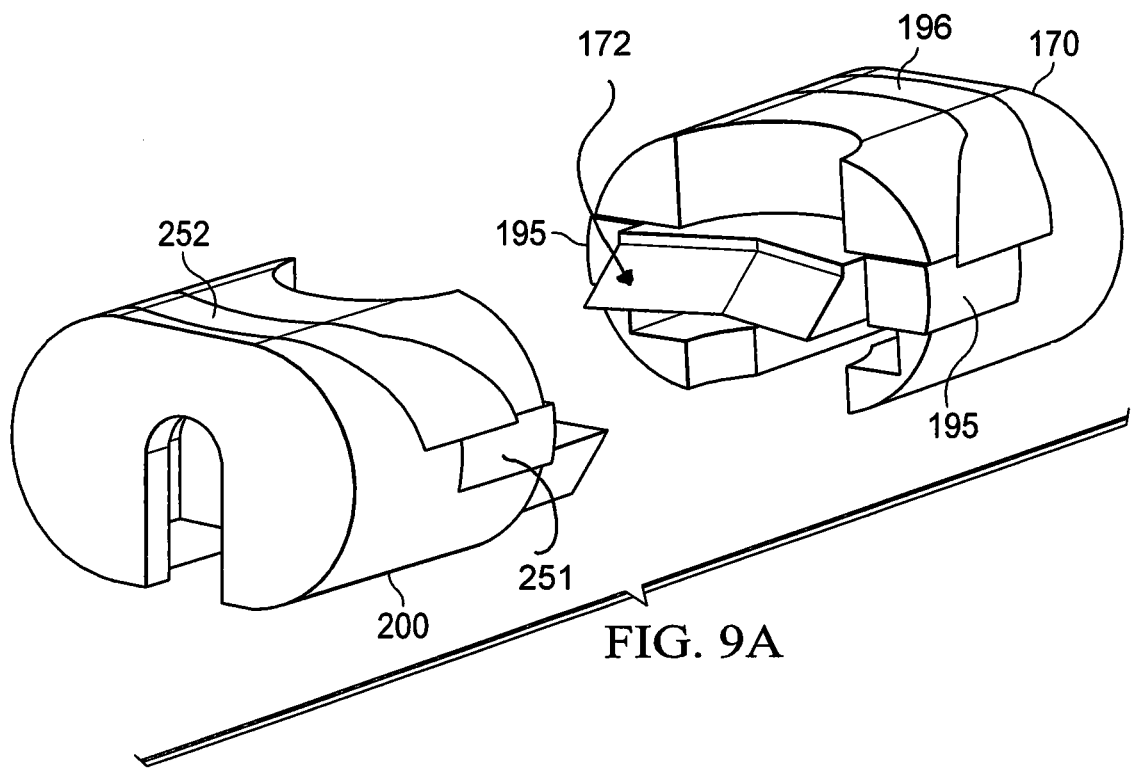
FIG. 9A is a perspective view of the lower shear ram and the upper shear ram wherein a mating surface of the upper shear ram is visible.
Figure 9B:
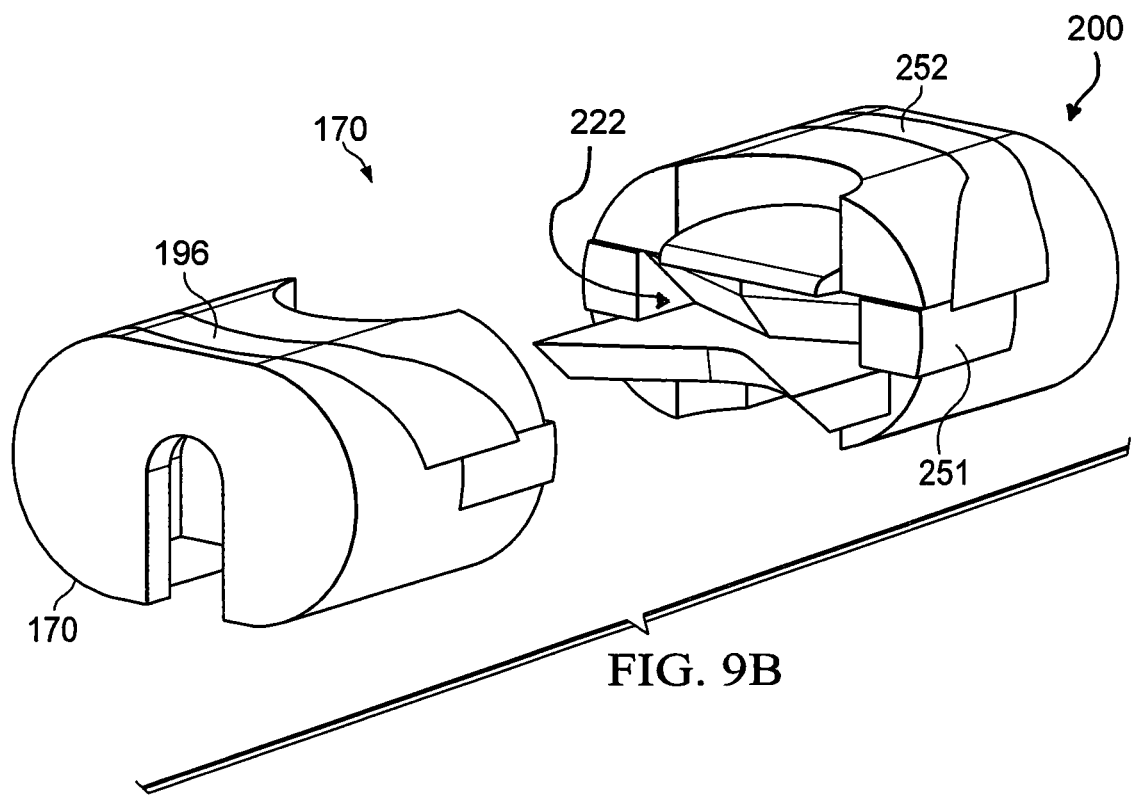
FIG. 9B is a perspective view of the lower shear ram and the upper shear ram wherein a mating surface of the lower shear ram is visible.
Figure 10:
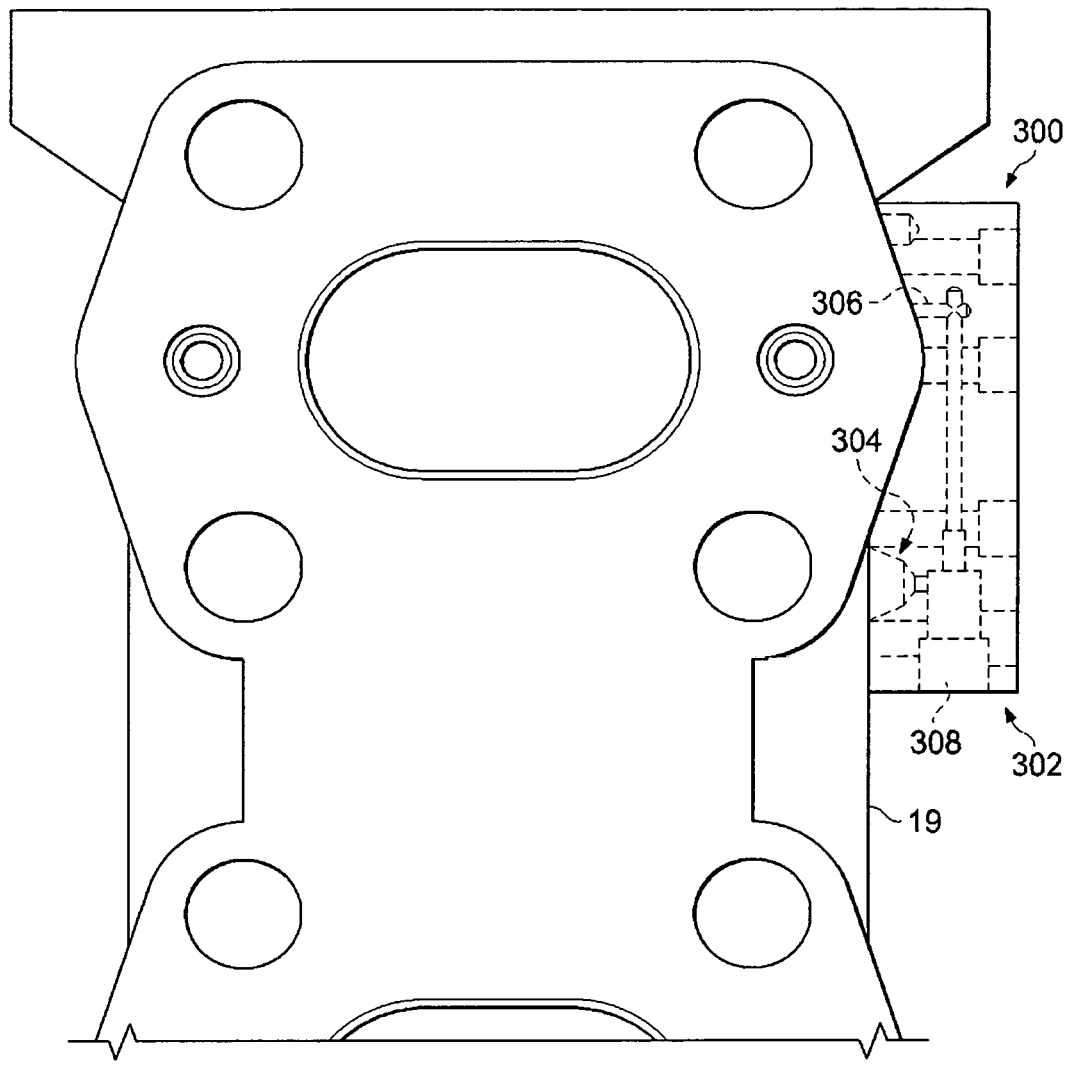
FIG. 10 is an elevation view of the blowout preventer body of FIG. 2 including a pressure equalization block.

An upper shear ram 170 (FIGS. 5, 7A-7F, 9A, 9B) is affixed to an end of said first inwardly extending shaft 134. Upper shear ram 170 has a blade member 172 defining a downwardly and forwardly extending sloping blade surface 174 having an upper edge 176 and a lower edge 178. Lower edge 178 extends forwardly of upper edge 176. Forwardly sloping blade surface 174 preferably defines an inwardly protruding V-shape. Blade surface 174 is preferably angled 40° from vertical for cutting tubing. Other blade angles may also be used, e.g., 35° to 55°. Flat 180 is on an upper surface of blade member 172. A right forward face 182, left forward face 184, and a semi-circular pipe receiving area 186 are above flat 180. Semi-circular pipe receiving area is between right forward face 182 and left forward face 184. A receiving area 190 (FIG. 7B) for bottom blade member 202 is defined by a lower surface of blade member 172. Side packer receiving recess 193 is provided for receiving side packer 195 (FIG. 9A). Top seal 196 (FIGS. 9A, 9B) is received in top seal receiving area 228. Ram packer receiving recess 223 is provided for receiving ram packer 251 (FIGS. 9A, 9B). The top seal is received in receiving area 228 (FIG. 7A). Forwardly facing orifices 197 and 198 are provided for receiving side packer 195.

A lower shear ram 200 (FIGS. 8A-8F, 9A, 9B) is affixed to an end of second inwardly extending shaft 144. The lower shear ram 200 has a blade member 202 that defines a downwardly and rearwardly extending sloping blade surface 204 having an upper edge 206 that extends forwardly of lower edge 208. Blade surface 204 is preferably angled 45° from vertical for cutting tubing. Other blade angles may be used, e.g., from 40° to 60°. The downwardly sloping blade surface 204 preferably defines an inwardly protruding V-shape 210. A pipe engaging portion 212 is on an upper surface of said blade member 202. Right forward face 214 and a left forward face 216 are adjacent to pipe engaging portion 212. A semi-circular pipe receiving area 218 is between right forward face 214 and left forward face 216. A blade receiving area 222 for top blade member 172 is above blade member 202. Top seal receiving recess 229 is provided for receiving top seal 252 (FIGS. 9A, 9B). Ram packer 251 (FIGS. 9A, 9B) and top seal 252 for lower shear ram 200 are similar to ram packer 251 and top seal 252 for upper shear ram 170. Forwardly facing orifices 230 and 232 are provided for an SSR ram packer.

Right forward face 214 of lower shear ram 200 and right forward face 182 of said upper shear ram 170 engage one another when bottom blade member 202 and top blade member 172 are fully closed overlapping one another.

Left forward face 216 of lower shear ram 200 and left forward face 186 of upper shear ram 170 engage one another when bottom blade member 202 and said top blade member 172 are fully closed overlapping one another.

Bottom blade member 202 is received within receiving area 190 of top ram 170 when bottom blade member 202 and top blade member 172 are fully closed overlapping one another. Top blade member 172 is received within receiving area 222 for bottom blade member 202 when bottom blade member 202 and top blade member 172 are fully closed overlapping one another.

Upper shear ram 170 is received in first bore orifice 22 of body 10 and lower shear ram 200 is received in second ram bore orifice 30 (not shown) of body 10. Upper shear ram 170 and lower shear ram 200 make up first shear ram assembly 350 (see, e.g., FIG. 11). Additional shear ram assemblies may be located in additional ram bore orifices formed within segments 14 of body 12. For example, second shear ram assembly 352 may be provided below first shear ram assembly 350 (see, e.g., FIG. 11).

Figure 11:
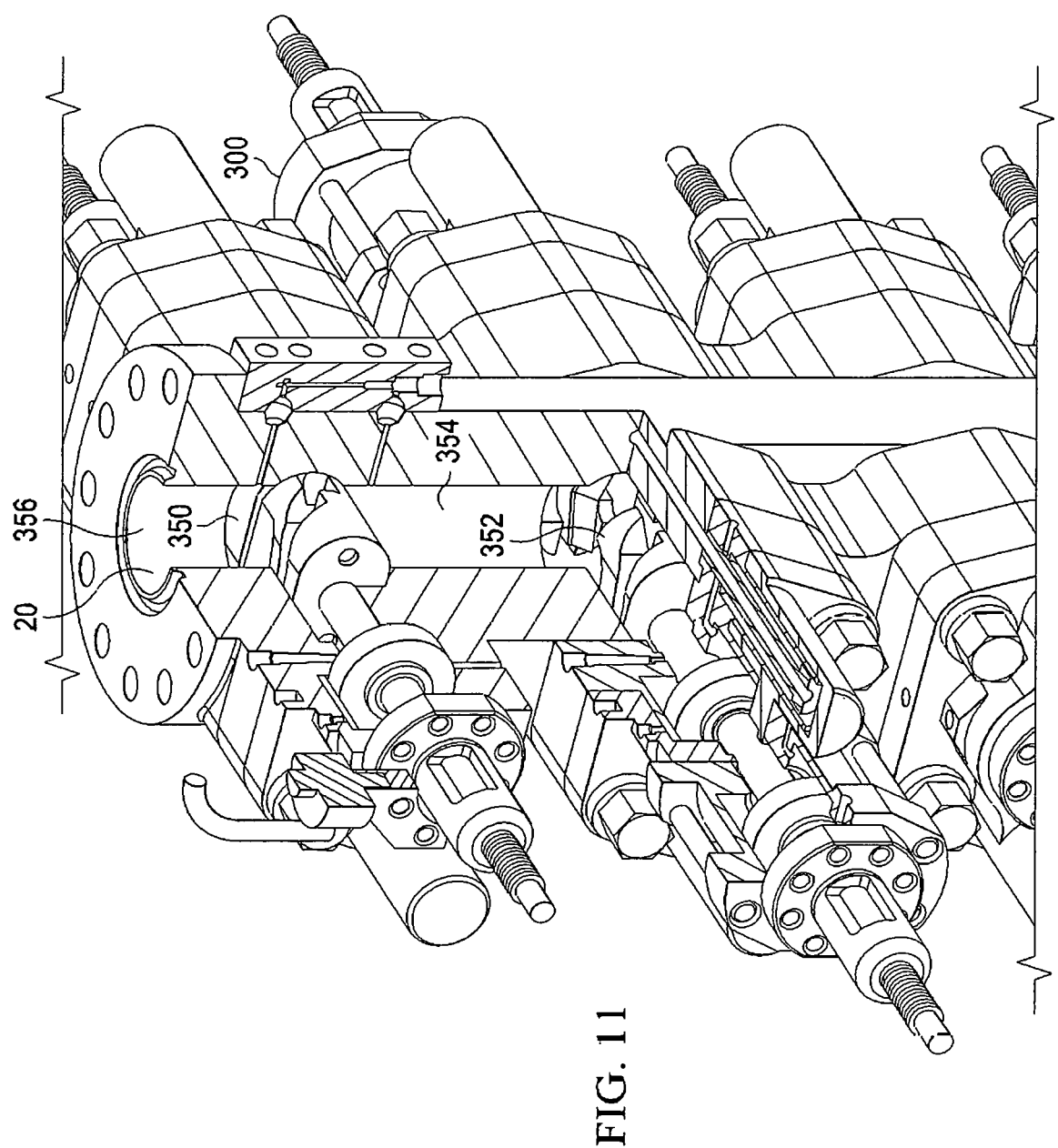
FIG. 11 is a perspective view of the blowout preventer body and pressure equalization block of FIG. 10.

Referring now to FIGS. 11 to 13, shown is an equalization block 300. Equalization block 300 is located on central section 19 of body 12 and includes longitudinal passageway 302 that communicates a first portal 304 and a second portal 306.

Referring now to FIGS. 10-14B, equalization block 300 defines an upper passageway 302, a lower passageway 304 and a communicating passageway 306 for communicating upper passageway 302 and lower passageway 304. Communicating passageway 306 has an externally exposed end 308.

Body 12 of blowout preventer 10 defines an upper pressure relief passageway 260 that communicates an outer surface of body 12 with vertical throughbore 20 at a location above shear rams 170 and 200. Body 12 further defines a lower pressure relief passageway 262 that communicates an outer surface of body 12 with vertical throughbore 20 at a location below shear rams 170 and 200. Although shear rams 170 and 200 are shown, it should be understood that other types of rams or sealing members may be used.

Referring to FIG. 11, in one example, wellbore pressure area 354 (FIGS. 12, 13), between first set of sealing rams 350 and second set of sealing rams 352, experiences wellbore pressure. Although blind rams 350 and 352 are shown, it should be understood that other types of rams or sealing members may be used. Wellbore pressure may be any pressure greater than surface pressure, presumably 0 psi. Surface pressure area 356, above first ram assembly 350 experiences surface pressure. Upper ram 170 and lower ram 200 of first ram assembly 350 are closed in between the surface pressure area 356 and well pressure area 354, and isolate the wellbore pressure from the surface pressure. Without equalization block 300, the closed first ram assembly 350 would not be able to open without first equalizing the pressure. The purpose of equalization block 300 is to provide a communication between the wellbore pressure area 354 and the surface pressure area 356, i.e., pressure from below first sealing rams 350, i.e., in wellbore pressure area 354, is allowed to enter an area above first sealing rams 350, i.e., in surface pressure area 356, by using equalizing valve 400 within equalization block 300.

Figure 12A:
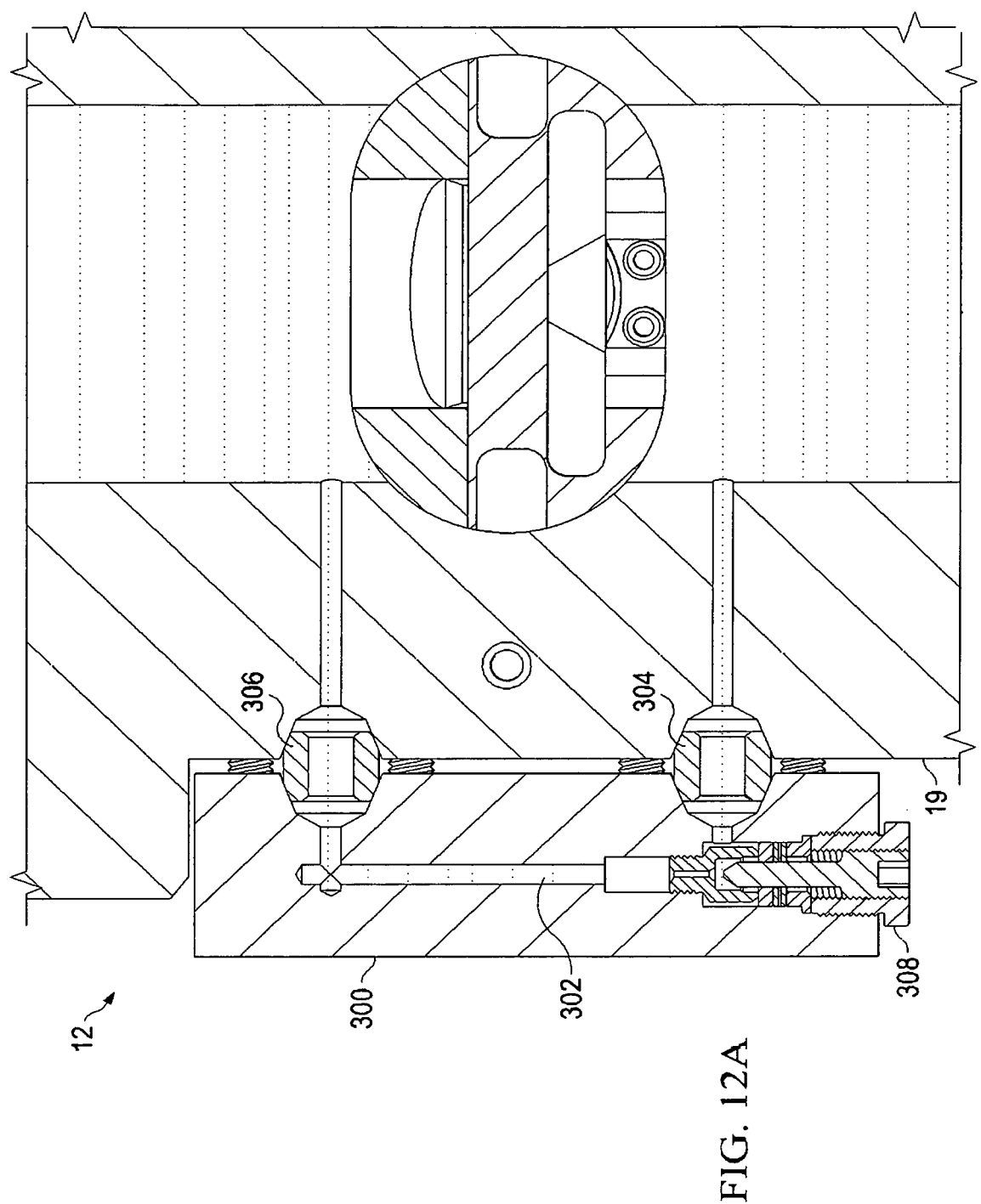
FIG. 12A is a cross-sectional view of the blowout preventer body and pressure equalization block of FIG. 10 showing the pressure equalization block in an open configuration.
Figure 12B:
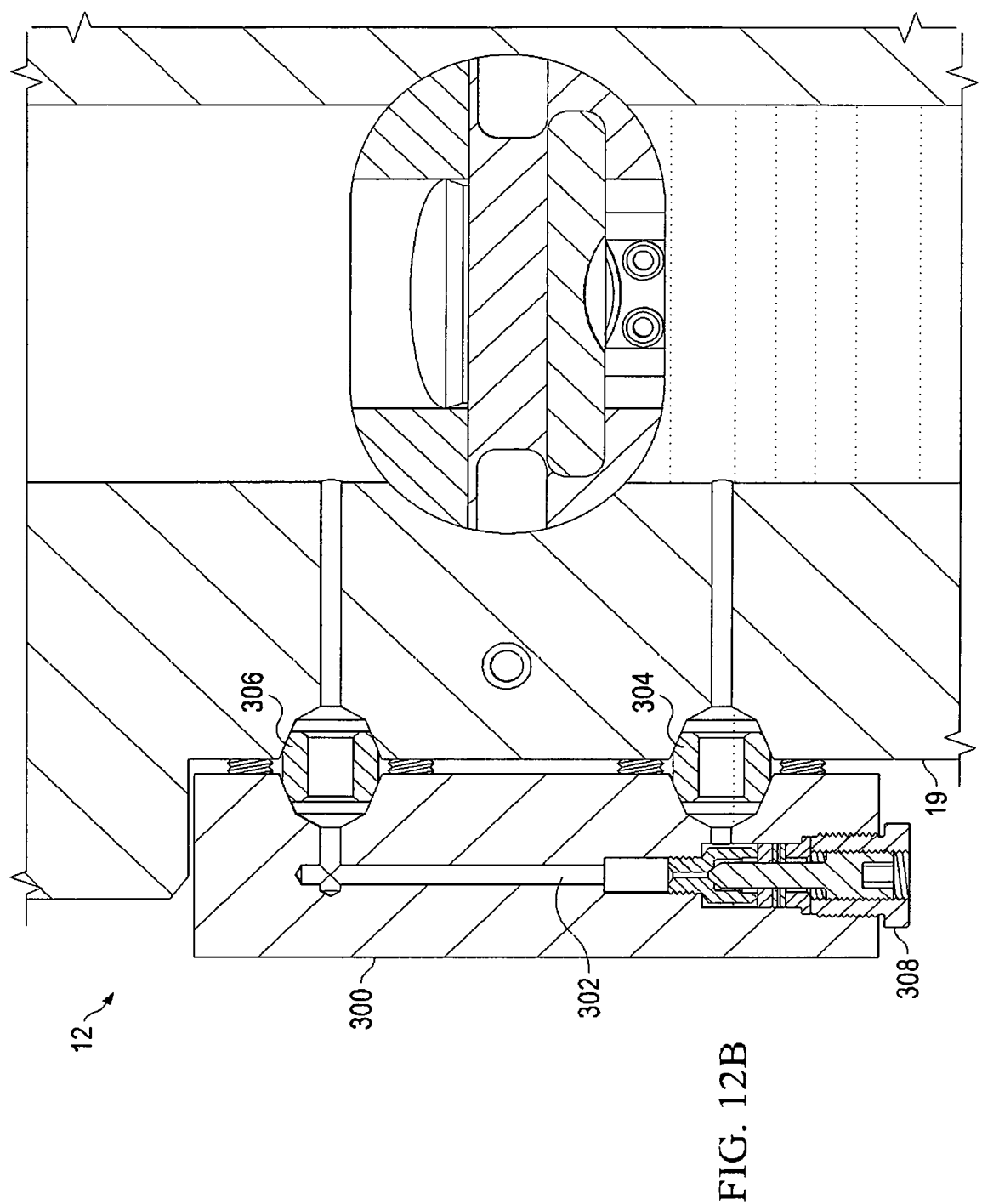
FIG. 12B is a cross-sectional view of the blowout preventer body and pressure equalization block of FIG. 10 showing the pressure equalization block in a closed configuration.

Referring now to FIGS. 12A and 12B, FIG. 12A shows a fully assembled equalization block 300 installed on BOP 10. Valve 400 is installed in equalization block 300 to control the pressure. FIG. 12A shows equalization block 300 in an open configuration wherein equalization valve 400 is open, allowing pressure to flow from wellbore pressure area 354 to the surface pressure area 356. FIG. 12B shows equalization valve 400 in a closed position, isolating wellbore pressure area 354 from the surface pressure area 356.

Equalizing valve 400 is received in externally exposed end 308 of communicating passageway 306. Equalizing valve includes a body 402 (FIGS. 14A, 14B) having an external end 404 and an internal end 406. Stopper 408 is received in said external end 404 of body 402. Stopper 408 has sealing tip 410. Tip member 412 is adjacent to internal end 406 of body 402. Tip member 412 defines distal end 414 and engaging end 416. Tip member 412 further defines outside surface 418, inside cavity 420, first passageway 422 in communication with said distal end 414 and second passageway 424. Second passageway 424 is in communication with inside cavity 420. Tip member 412 further comprising a sealing surface 426 between inside cavity 420 and first passageway 422.

Equalizing valve 400 is installed within externally exposed end 308 of communicating passageway 306 of equalizing block 300. First passageway 422 communicates with first upper passageway 302 via communication passageway 306 of equalization block 300 and second passageway 424 of equalizing valve 400 communicates with lower passageway 304 of equalization block 300.

When stopper 408 is threaded inwardly within body 402 of equalization valve 400, sealing tip 410 of stopper 408 engages sealing surface 426 for preventing pressure equalization through lower pressure relief passageway 262 (FIG. 3), through lower passageway 304 (FIGS. 12A and 12B), and through second portal 306 in equalization block 300.

When stopper 408 is threaded outwardly within body 402 of equalization valve 400, sealing tip 410 of stopper 408 is disengaged from sealing surface 426, thereby allowing for pressure equalization to occur through lower pressure relief passageway 262, through lower passageway portal 304, through second passageway 424, past sealing surface 426, through first passageway 422, communicating passageway 306, upper passageway 302, and upper pressure relief passageway 260 for equalizing pressure above and below upper shear ram 170.

Although listed "second" components are not also shown in the figures, it should be understood that "second" components may be identical or similar to listed "first" components that are discussed, above, and shown in the figures.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A blowout preventer assembly comprising: a body;
an upper ram assembly in said body;
a lower ram assembly in said body;
wherein said body defines a surface pressure area above said upper ram assembly;
wherein said body defines a wellbore pressure area between said upper ram assembly and said lower ram assembly;
an upper pressure relief passageway in said body that communicates an outer surface of said body with said surface pressure area;
a lower pressure relief passageway in said body that communicates said outer surface of said body with said wellbore pressure area;
an equalizing block defining an inside surface for locating the entire equalizing block adjacent said body, said equalizing block defining passageways that communicate, with said upper pressure relief passageway and with said lower pressure relief passageway;
an equalizing valve received in said equalizing block for selectively allowing communication between said passageways of said equalizing block for facilitating equalization of pressure between said surface pressure area and said wellbore pressure area.

2. The blowout preventer assembly according to claim 1 wherein:
said body defining an upper segment having a first face and a second face, said body defining a lower segment having a first face and a second face, said body defining a vertical through bore between said first face and said second face of said upper segment and between said first face and said second face of said lower segment;
said first face of said upper segment defining a first upper ram bore orifice;
said second face of said upper segment defining a second upper ram bore orifice;
said first face of said lower segment defining a first lower ram bore orifice;
said second face of said lower segment defining a second lower ram bore orifice;
said upper ram assembly having a first ram and a second ram, wherein one of said first ram and said second ram of said upper ram assembly is received in said first upper ram bore orifice and the other of said first ram and said second ram of said upper ram assembly is received in said second upper ram bore orifice;

said lower ram assembly having a first ram and a second ram, wherein one of said first ram and said second ram of said lower ram assembly is received in said first lower ram bore orifice and the other of said first ram and said second ram of said lower ram assembly is received in said second lower ram bore orifice;

wherein said vertical through bore defines said wellbore pressure area between said upper ram assembly and said lower ram assembly;

wherein said vertical through bore defines said surface pressure area above said upper ram assembly;

wherein said upper pressure relief passageway of said body communicates said outer surface of said body with said surface pressure area of said vertical through bore;

wherein said lower pressure relief passageway of said body communicates said outer surface of said body with said wellbore pressure area of said vertical through bore.

3. The blowout preventer assembly according to claim 1 wherein:
said first ram of said upper ram assembly is an upper ram;
said second ram of said upper ram assembly is a lower ram.

4. The blowout preventer assembly according to claim 1 wherein:
said first ram of said lower ram assembly is an upper ram;
said second ram of said lower ram assembly is a lower ram.

5. The blowout preventer assembly according to claim 1 further comprising:
an equalizing block defining a communicating passageway in communication with said upper passageway and said lower passageway;
wherein said equalizing valve selectively allows communication between said upper passageway and said lower passageway of said equalizing member.

6. The blowout preventer assembly according to claim 5 wherein said equalizing block is affixed to said outer surface of said body.

7. The blowout preventer assembly according to claim 6 wherein:
said communicating passageway of said equalizing block further defines an externally exposed end; and wherein said equalizing valve is received in said externally exposed end of said communicating passageway.

8. The blowout preventer assembly according to claim 1 wherein said equalizing valve comprises:
a valve body having a first end and a second end;
a stopper received in said first end of said valve body, said stopper having a sealing tip;
a tip member adjacent said second end of said valve body, said tip member defining a distal end and an engaging end, said tip member further defining an outside surface, an inside cavity, a first passageway in communication with said distal end and a second passageway in communication with said inside cavity, said tip member further comprising a sealing surface between said inside cavity and said first passageway.

9. The blowout preventer assembly according to claim 8 wherein:
when said stopper is threaded inwardly within said valve body, said sealing tip of said stopper engages said sealing surface of said tip member for preventing pressure equalization of said surface pressure area and said wellbore pressure area of said vertical through bore;
wherein when said stopper is threaded outwardly within said valve body, said sealing tip of said stopper is disengaged from said sealing surface, thereby allowing for pressure equalization of said surface pressure area and said wellbore pressure area of said vertical through bore.

10. The blowout preventer assembly according to claim 1, wherein said passageways of said equalizing block comprise an upper passageway and a lower passageway, said equalizing block defining a longitudinal passageway, said upper passageway having a first end in communication with said inside surface and a second end in communication with said longitudinal passageway, said lower passageway having a first end in communication with said inside surface and a second end in communication with said longitudinal passageway.

11. The blowout preventer assembly according to claim 10 wherein said equalizing valve is received in said longitudinal passageway.

12. The blowout preventer assembly according to claim 11 wherein:
said body defines a vertical throughbore;
said equalizing valve having a stopper defining a sealing tip, said stopper oriented parallel to said vertical throughbore.

13. The blowout preventer assembly according to claim 1 wherein:
said body defines a vertical throughbore;
said equalizing valve having a stopper defining a sealing tip, said stopper oriented parallel to said vertical throughbore.

* * * * *